April 13, 1954

F. WASCHEK 2,675,046

RESILIENT WHEEL

Filed Aug. 15, 1952

INVENTOR.
FRANK WASCHEK,
BY
McMorrow, Berman & Davidson
ATTORNEYS.

April 13, 1954     F. WASCHEK     2,675,046
RESILIENT WHEEL
Filed Aug. 15, 1952                            2 Sheets-Sheet 2
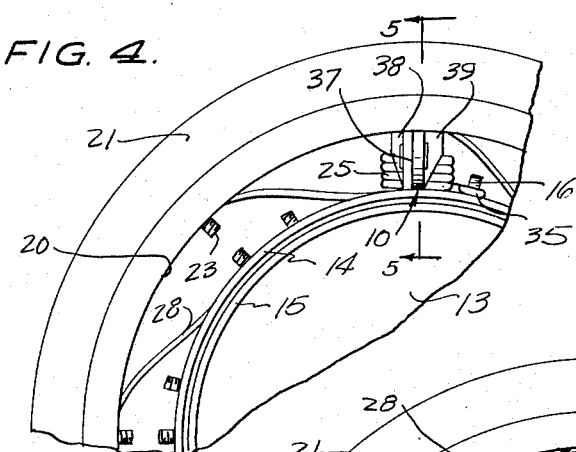
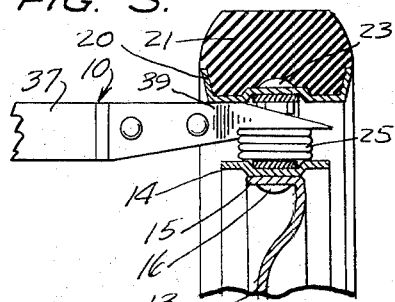
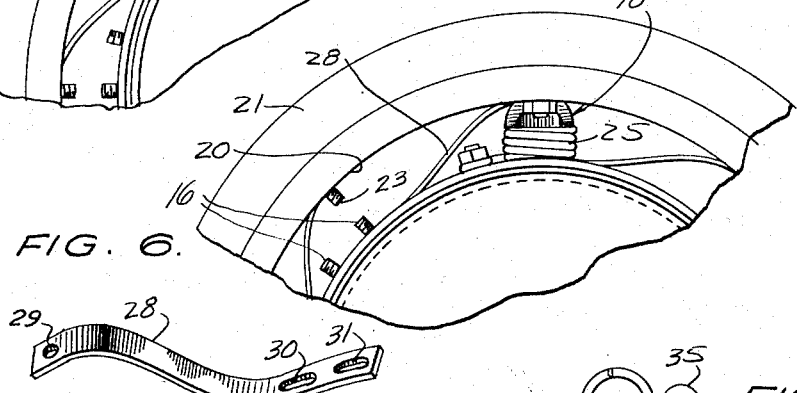
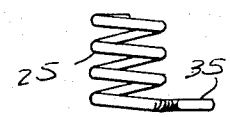
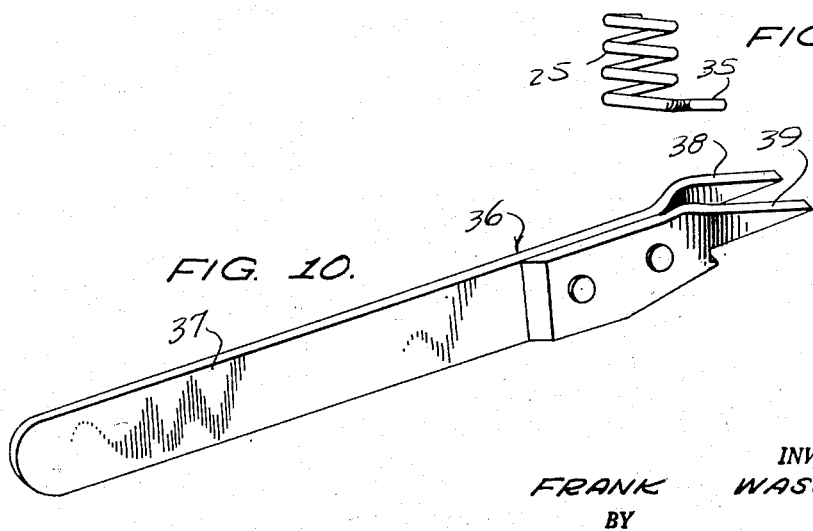
INVENTOR.
FRANK WASCHEK,
BY
McMorrow, Berman & Davidson
ATTORNEYS.

Patented Apr. 13, 1954

2,675,046

UNITED STATES PATENT OFFICE 2,675,046

RESILIENT WHEEL

Frank Waschek, Maple City, Mich.

Application August 15, 1952, Serial No. 304,577

1 Claim. (Cl. 152—39)

This invention relates to resilient wheels and more particularly to a wheel having spaced apart and substantially concentric inner and outer portions and spring means disposed between the inner and outer portions for supporting the inner portion on the outer portion, and to a special tool for assembling and disassembling the wheel.

It is among the objects of the invention to provide an improved resilient wheel which comprises a hub and an inner rim concentrically surrounding the hub and secured thereto, an outer portion including a tire and a tire rim, and spring means interposed between the outer and inner portions of the wheel for supporting the inner portion on the outer portion; in which the spring means effectively transmit both radial or load forces and tangential or torque forces between the inner and outer portions of the wheel; in which the spring means are arranged to provide an evenly distributed resilient force around the wheel between the inner and outer portions thereof; in which the spring means includes springs removably mounted in the wheel and a special tool is provided for installing and removing the springs; and which is simple and durable in construction, economical to manufacture, and efficient and effective in operation.

Other objects and advantages will become apparent from a consideration of the following description and the appended claim in conjunction with the accompanying drawings wherein:

Figure 4 is a fragmentary side elevational view similar to Figure 1 showing a tool applied to the resilient wheel for removing a spring therefrom;

Figure 5 is a fragmentary cross sectional view on the line 5—5 of Figure 4;

Figure 6 is a fragmentary side elevational view of the wheel and spring removing tool looking at the side of the wheel opposite the side illustrated in Figure 4;

Figure 7 is a perspective view of one form of spring used in the resilient wheel;

Figure 8 is an end elevational view of a different type of spring used in the wheel;

Figure 9 is a side elevational view of the spring shown in Figure 8; and

Figure 10 is a perspective view of the spring removing tool.

Figure 1:
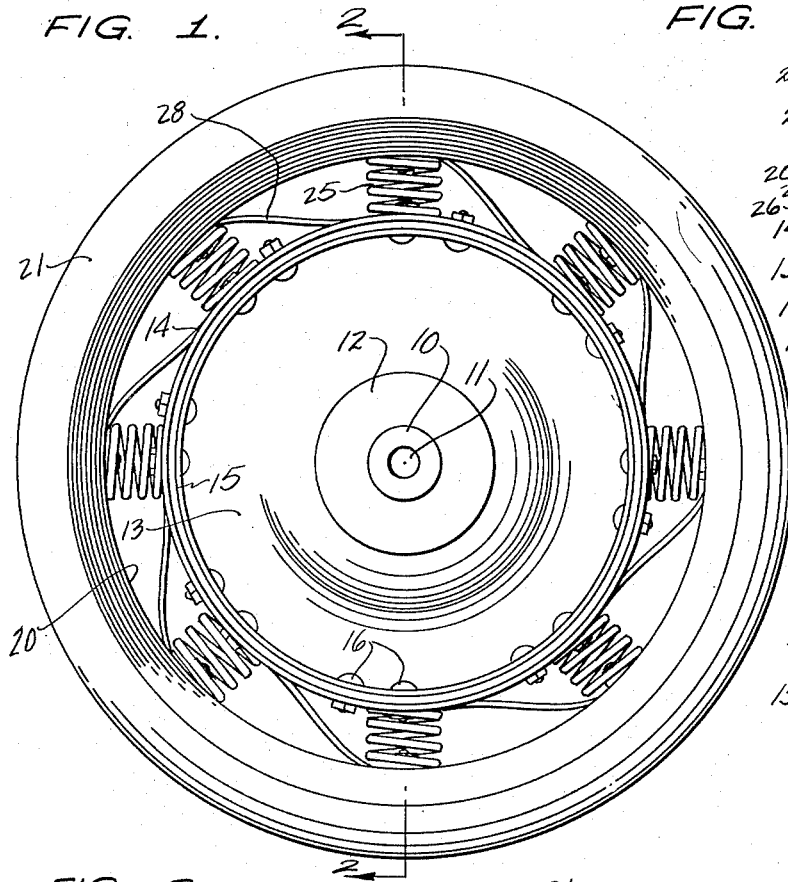
Figure 1 is a side elevational view of a resilient wheel illustrative of the invention.
Figure 2:
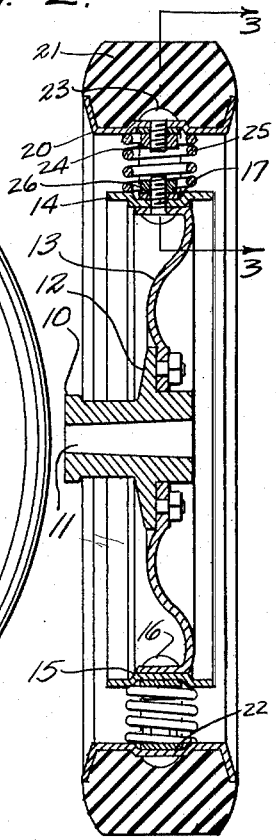
Figure 2 is a cross sectional view on the line 2—2 of Figure 1.
Figure 3:
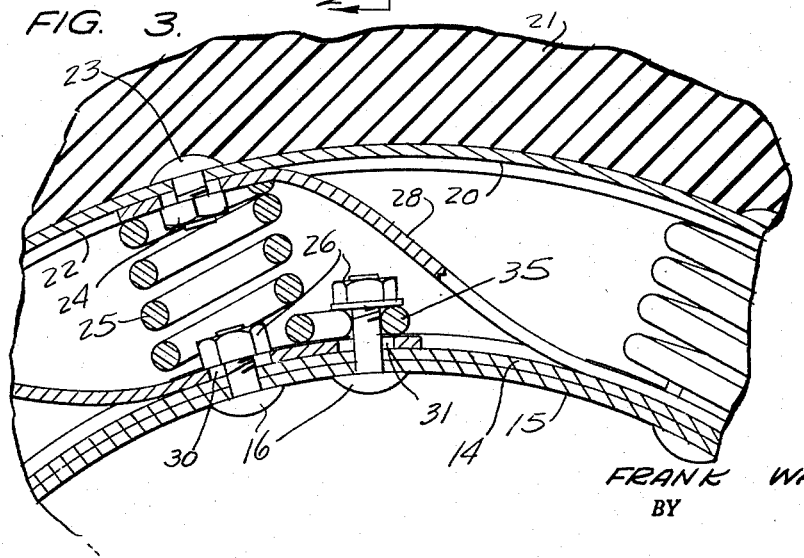
Figure 3 is a fragmentary cross sectional view on an enlarged scale on the line 3—3 of Figure 2.

With continued reference to the drawings, the numeral 10 indicates a wheel hub having an axle receiving bore 11 extending longitudinally therethrough and having an annular flange 12 intermediate the length thereof with one face substantially in a plane perpendicular to the longitudinal center line or axis of the bore 11.

An annular disc or web 13 has a central aperture receiving the hub 10 and this web is disposed against said one face of the flange 12 and secured to the flange around the hub receiving aperture in the web.

An inner band or rim 14 surrounds the web 13 and the web is provided with an annular peripheral flange 15 which fits closely within the inner rim 14 and is secured to the inner rim by suitable means, such as the screws 16. The inner rim 14 is of generally cylindrical shape and has in its outer surface a medially disposed shallow groove 17 extending therearound.

An outer or tire rim 20 of channel shaped cross section surrounds and is circumferentially spaced from the inner rim 14 and a tire 21 of a suitable resilient material, such as vulcanized rubber, surrounds and is disposed partly within the outer rim 20. The outer rim has in its inner surface a shallow, medially disposed groove 22 which extends therearound in opposition to the annular groove 17 in the inner rim 14. Screws 23 extend through apertures in the outer rim disposed at substantially equal angular intervals around and substantially midway the width of the outer rim and nuts 24 threaded onto these screws in the outer rim.

Coiled compression springs 25 are interposed between the inner rim 14 and the outer rim 20 and each spring has one end in engagement with the inner surface of the outer rim 20 and surrounding a corresponding nut 24 on a screw 23 and has its other end in engagement with the outer surface of the inner rim 14 and surrounding a corresponding nut 26 on a screw 16. In the arrangement illustrated, there are eight of the coiled compression springs 25 spaced apart at substantially equal angular intervals of forty five degrees and these springs resiliently maintain the inner portion of the wheel including the hub 10, web 13, and inner rim 14 substantially concentric of the outer portion of the wheel including the outer rim 20 and tire 21. The springs 25 are resiliently compressible, however, to provide a limited freedom of resiliently resisted movement of the inner portion relative to the outer portion of the wheel and support the load forces between the inner and outer portions of the wheel.

Longitudinally curved leaf spring 28 are disposed one between each two adjacent coil springs 25 and each of these springs 28 has a single aperture 29 near one end thereof and two elongated apertures 30 and 31 spaced apart longitudinally of the leaf spring near the other end of the latter. Each leaf spring 28 has its end provided with the single aperture 29 disposed between the outer rim 20 and the outer end of the corresponding coiled spring 25 and its end provided with the apertures 30 and 31 disposed between the inner rim 14 and the inner end of the adjacent coiled spring 25, with the apertures 30 and 31 respectively receiving adjacently disposed screws 16. The ends of the springs 28 are clamped between the inner and outer rims 14 and 20 and the nuts 26 and 24, so that these springs are firmly secured to the inner and outer portions of the wheel and, as these springs extend tangentially of the inner and outer rims, they are effective to transmit torque forces between the inner and outer portions of the wheel.

It will be noted that each of the coil springs 25 has on its end adjacent the inner rim 14 a laterally extending loop or eye 35 which receives one of the screws of the corresponding pair of closely spaced screws 16 while the same end of the spring surrounds the nut on the other screw of the same pair.

The coil springs are inserted into and removed from the space between the inner and outer rims of the wheel by a special spring tool illustrated in detail in Figure 10, and generally indicated at 36. This tool has an elongated handle 37 and a pair of spaced part and substantially parallel prongs 38 and 39 extending longitudinally from one end of the handle. The prongs 38 and 39 are tapered from their proximal to their distal ends in a manner such that their tapered or inclined edges lie substantially in converging planes which extend across the space between the two prongs and the prongs are pointed at their outer or distal ends.

In using the tool 10 to remove the coil springs 25 from the wheel, the prongs 38 and 39 are inserted between the outer end of a selected coil spring 25 and the outer rim 20 with the corresponding nut 24 between the prongs. After the outer end of the coiled spring has been moved away from the inner surface of the outer rim the tool is tipped in a manner to force the outer end of the spring out of the space between the inner and outer rims of the wheels. After the outer ends of the coil springs have been moved out of engagement with the outer rim the inner ends are released by removing the corresponding nuts 26 from the associated screws 16. The leaf springs 28 are removed by removing the corresponding nuts 24 and 26 to release the ends of these springs from the outer and inner rims of the wheel. The springs are assembled with the outer and inner rims of the wheel by an obvious reversal of the above method.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A resilient wheel comprising an inner portion including a circular web provided with a peripheral flange and a central opening, a hub extending through said central opening and having an annular flange thereon secured to said web, and an inner rim surrounding and secured to said peripheral flange, an outer portion including an outer rim surrounding and spaced from said inner rim, and a tire of resilient material carried by said outer rim, coil springs interposed between said inner and outer rims at substantially equal angular intervals therearound and each having its outer end engaging the inner surface of said outer rim and its inner end engaging and attached to said inner rim, and leaf springs extending one between each two adjacent coil springs and each having one end attached to said outer rim at the outer end of one of said two adjacent coil springs and its other end attached to said inner rim at the inner end of the other of said two adjacent coil springs, said rims having apertures spaced apart therearound and shallow grooves in the surfaces thereof contacted by said springs, which grooves receive the corresponding end portions of said leaf springs, and each of said leaf springs having apertures near the opposite ends thereof and each of said coil springs having a bolt receiving eye at at least one end thereof, and bolts extending through the apertures in said rims and said leaf springs and the eyes of said coil springs securing said springs to said rims.

References Cited in the file of this patent

UNITED STATES PATENTS

| Number | Name | Date |
|---|---|---|
| 989,256 | Hayden | Apr. 11, 1911 |
| 1,107,093 | Minnick | Aug. 11, 1914 |
| 1,443,478 | Kovach | Jan. 30, 1923 |
| 2,448,313 | Hughes | Aug. 31, 1948 |